United States Patent
Mizuki et al.

(10) Patent No.: US 9,553,840 B2
(45) Date of Patent: Jan. 24, 2017

(54) INFORMATION SHARING SYSTEM, SERVER DEVICE, DISPLAY SYSTEM, STORAGE MEDIUM, AND INFORMATION SHARING METHOD

(71) Applicant: NINTENDO CO., LTD., Kyoto (JP)

(72) Inventors: Kiyoshi Mizuki, Kyoto (JP); Hideto Yuzawa, Kyoto (JP); Ryota Oiwa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 209 days.

(21) Appl. No.: 14/182,310

(22) Filed: Feb. 18, 2014

(65) Prior Publication Data

US 2014/0330912 A1 Nov. 6, 2014

(30) Foreign Application Priority Data

May 1, 2013 (JP) .................................. 2013-096532

(51) Int. Cl.
| | |
|---|---|
| *G06F 15/16* | (2006.01) |
| *H04L 12/58* | (2006.01) |
| *G06Q 30/02* | (2012.01) |
| *A63F 13/79* | (2014.01) |

(52) U.S. Cl.
CPC ............... *H04L 51/32* (2013.01); *A63F 13/79* (2014.09); *G06Q 30/02* (2013.01); *H04L 51/12* (2013.01); *H04L 51/14* (2013.01)

(58) Field of Classification Search
None
See application file for complete search history.

(56) References Cited

U.S. PATENT DOCUMENTS

| | | | | |
|---|---|---|---|---|
| 8,856,232 B1* | 10/2014 | Swerdlow | ............. | G06Q 10/10 709/204 |
| 2011/0307557 A1* | 12/2011 | Kadashevich | ....... | G06Q 10/107 709/205 |
| 2012/0117114 A1* | 5/2012 | Goranson | ................ | G06N 5/00 707/776 |
| 2012/0246267 A1* | 9/2012 | Mallet | .................... | G06Q 50/01 709/217 |
| 2013/0066894 A1* | 3/2013 | Ishida | .................... | G06Q 50/01 707/758 |
| 2013/0067028 A1* | 3/2013 | Takamura | ............. | G06Q 50/01 709/217 |
| 2013/0124499 A1* | 5/2013 | Liau | ........................ | G06F 15/16 707/709 |
| 2014/0067998 A1* | 3/2014 | Garcia | ................ | H04L 65/4084 709/217 |
| 2014/0089104 A1* | 3/2014 | Nanba | ................ | G06Q 30/0251 705/14.66 |

(Continued)

FOREIGN PATENT DOCUMENTS

JP 2010-46159 3/2010

*Primary Examiner* — David Lazaro
(74) *Attorney, Agent, or Firm* — Nixon & Vanderhye P.C.

(57) ABSTRACT

An example of an information sharing system includes at least one processor configured to: accept posting information on a content posted by each of a plurality of users; display the accepted posting information on a first screen; and display, on a second screen, the posting information, which is to be displayed on the first screen and which is posted by one of the plurality of users whose status satisfies a condition on usage of the content.

13 Claims, 6 Drawing Sheets (56) References Cited

U.S. PATENT DOCUMENTS

| | | | | |
|---|---|---|---|---|
| 2014/0143334 A1* | 5/2014 | Jung | ............... | G06Q 10/101 709/204 |
| 2014/0146052 A1* | 5/2014 | Takamura | ............... | G06F 13/00 345/440 |
| 2014/0156556 A1* | 6/2014 | Lavian | ............... | G06Q 30/0282 705/347 |

\* cited by examiner

INFORMATION SHARING SYSTEM, SERVER DEVICE, DISPLAY SYSTEM, STORAGE MEDIUM, AND INFORMATION SHARING METHOD

CROSS REFERENCE TO RELATED APPLICATIONS

The disclosure of Japanese Patent Application No. 2013-96532, filed on May 1, 2013, is incorporated herein by reference.

FIELD

The technique described herein relates to browsing of posting information.

BACKGROUND AND SUMMARY

When users share information online concerning products or services by using a SNS (Social networking service) or a BBS (Bulletin Board System), a case may arise that where some information is of use to a user while other information is not of use to the user.

According to one aspect of the technique, there is provided an information sharing system, including at least one processor configured to: accept posting information on a content posted by each of a plurality of users; display the accepted posting information on a first screen; and display, on a second screen, the posting information, which is to be displayed on the first screen and which is posted by one of the plurality of users whose status satisfies a condition on usage of the content.

DETAILED DESCRIPTION OF NON-LIMITING EXEMPLARY EMBODIMENTS

1. Exemplary Embodiment

Figure 1:
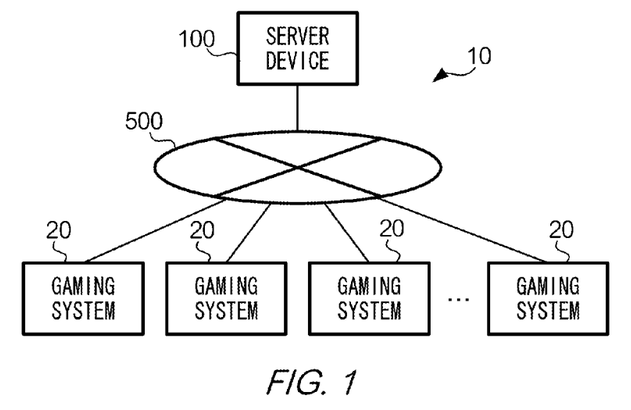
FIG. 1 is a block diagram showing an example of a non-limiting configuration of an information sharing system.

FIG. 1 is a block diagram showing a configuration of information sharing system 10, which is an exemplary embodiment according to the present technique. The present exemplary embodiment relates to execution of a game, and provides a non-limiting example of application software, and provision of an information sharing service for sharing information about a game (such as posting information) among a plurality of users. Information sharing system 10 includes server device 100 and plural gaming systems 20, which are connected to one another via network 500. Network 500 is a network such as the Internet. However, Network 500 is not limited to the Internet.

Server device 100 is a computer device for providing the information sharing service. Server device 100 receives data such as posting information from plural gaming systems 20 and enables users to share the posting information according to one or more predetermined conditions. In this exemplary embodiment, a user may belong to a "community" consisting of a gaming group, and may browse posting information posted by other users with respect to one or more such communities. A user may participate in one or more communities, and may browse posting information posted to a community to which the user may not necessarily belong. In addition, a user is not required to own or to have played a game previously in order to participate in a community for the game.

Figure 2:
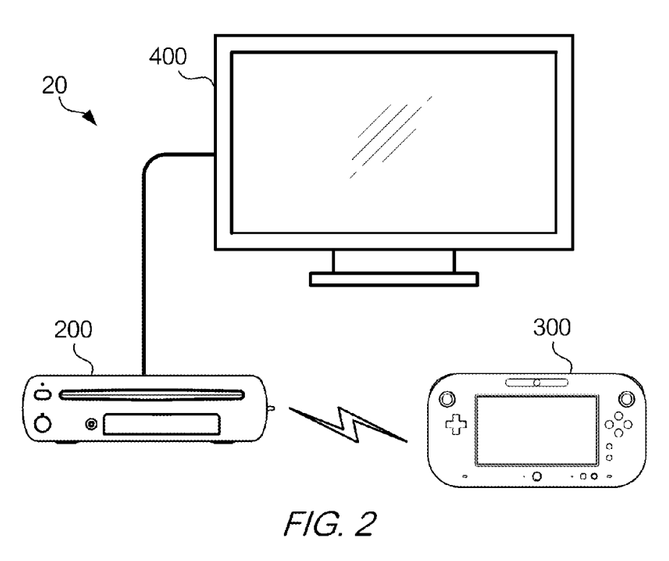
FIG. 2 is a block diagram showing an example of a non-limiting configuration of a gaming system.

FIG. 2 is a block diagram showing a configuration of gaming system 20. Gaming system 20 is an information-processing system provided at a location such as a user's home. Gaming system 20 may be used by a single user or by a plurality of users such as a family. Gaming system 20 includes main device 200, controller 300, and television 400.

Main device 200 is an information-processing device connected to network 500. Main device 200 executes processes that are required for providing an information sharing service or a game. The processes include operation of display controls for controller 300 and television 400.

Controller 300 is a portable input terminal into which a user inputs operations. Additionally, controller 300 has a display area, and the display area also can function as a display device. Controller 300 herein exchanges data with main device 200 via wireless communication. However, controller 300 also may communicate with main device 200 via wired communication.

Television 400 is a display device for displaying a game screen and posting information. Television 400 is connected to main device 200 and is used to display an image under control of main device 200. It is to be noted that gaming system 20 may use another display device such as a projector instead of television 400.

Figure 3:
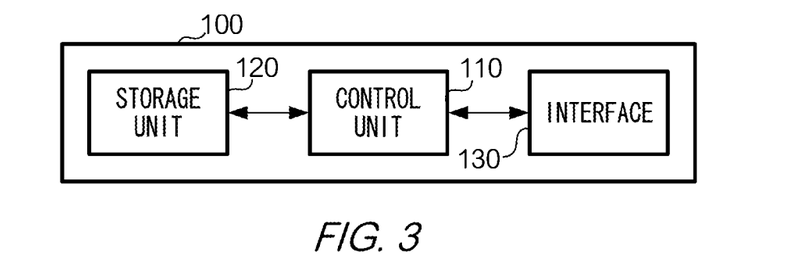
FIG. 3 is a block diagram showing an example of a non-limiting hardware configuration of a server device.

FIG. 3 is a block diagram showing a hardware configuration of server device 100. Server device 100 includes control unit 110, storage unit 120, and interface 130. Control unit 110 is a unit for controlling operations of server device 100. Specifically, control unit 110 includes a processor such as a CPU (central processing unit) and a main memory, and executes programs to control operations of components of server device 100. Storage unit 120 is a unit for storing data. Specifically, storage unit 120 includes a storage medium such as a hard disk, and stores data as described below. Interface 130 is a unit for exchanging data with gaming system 20 via network 500.

It is to be noted that data using server device 100 may be stored in an external storage device, instead of in a memory included in server device 100 such as storage unit 120. In addition, functions of server device 100 may be realized by use of a single apparatus or by use of multiple apparatuses (servers) in cooperation with each other.

Figure 4:
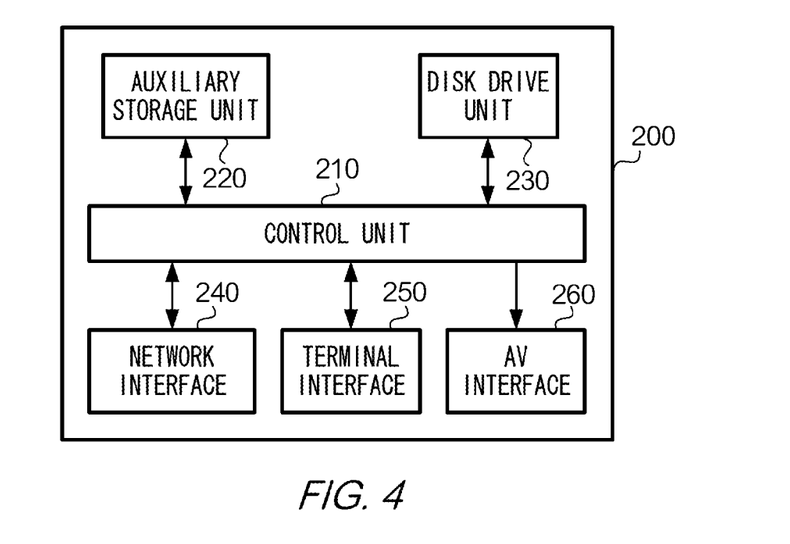
FIG. 4 is a block diagram showing an example of a non-limiting hardware configuration of a main device.

FIG. 4 is a block diagram showing a hardware configuration of main device 200. Main device 200 includes control unit 210, auxiliary storage unit 220, disk drive unit 230, network interface 240, terminal interface 250, and AV (Audio and Visual) interface 260.

Control unit 210 is a unit for controlling operations of components of main device 200. Specifically, control unit 210 includes a processor such as a CPU or a GPU (Graphics Processing Unit), a memory such as a main memory or a VRAM (Video Random Access Memory), and an input-output interface for exchanging information with components of main device 200. Control unit 210 executes programs to control generation of image data to be transmitted to controller 300 and display device 400.

Auxiliary storage unit 220 is a unit for storing data used by control unit 210. Auxiliary storage unit 220 is, for example, a flash memory or a hard disk. Auxiliary storage unit 220 may include a data reader/writer of a detachable storage medium (removable medium) such as a memory card. Auxiliary storage unit 220 can store programs executed by controller 210 and data accepted via network interface 240 or terminal interface 250. For example, when a game program that is for sale online is downloaded, auxiliary storage unit 220 can store the program.

Disk drive unit 230 is a unit for reading data stored in an optical disk (an optical recording medium). The optical disk may, for example, store, data required for executing a game such as a game program. Disk drive unit 230 may be configured to read another recording medium such as a magnetooptical disk or a semiconductor memory.

Network interface 240 is a unit for connecting to network 500. Network interface 240 exchanges data with server device 100 according to an instruction of control unit 210. On the other hand, terminal interface 250 is a unit for connecting to controller 300. Terminal interface 250 performs wireless communication by using a communication system such as Wi-Fi, Bluetooth, or infrared communication. The communication system is not limited to the system described above.

AV interface 260 is a unit for providing image data or audio data to television 400. Specifically, AV interface 260 includes one or more interfaces such as a HDMI (High-Definition Multimedia Interface) interface or an analog interface.

Figure 5:
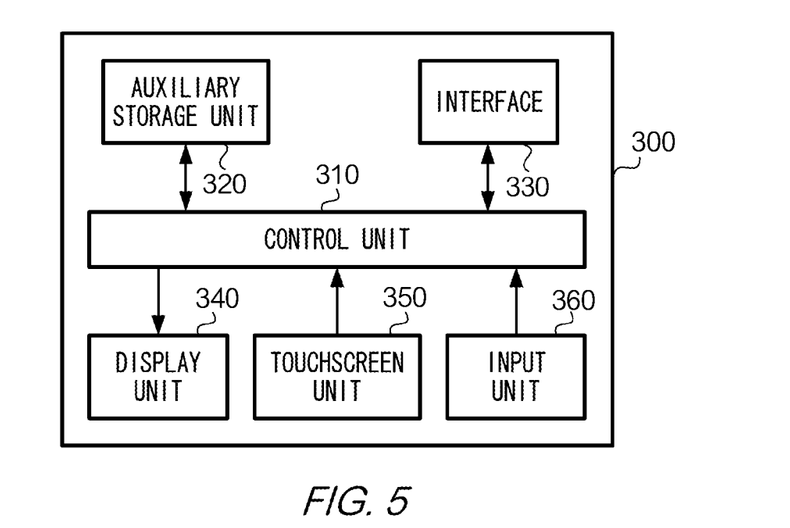
FIG. 5 is a block diagram showing an example of a non-limiting hardware configuration of a controller.

FIG. 5 is a block diagram showing a hardware configuration of controller 300. Controller 300 includes control unit 310, auxiliary storage unit 320, interface 330, display unit 340, touchscreen unit 350, and input unit 360.

Control unit 210 is a unit for controlling operations of components of controller 300. Specifically, control unit 310 includes a processor such as a CPU, a main memory, and an input-output interface for exchanging information with components of controller 300. Control unit 310 executes programs to control image display and exchange data with main device 200.

Auxiliary storage unit 320 is a unit for storing data used by control unit 310. Auxiliary storage unit 220 may be, for example, a flash memory. Auxiliary storage unit 220 may include a data reader/writer of a detachable storage medium such as a memory card.

Interface 330 is a unit for communicating with main device 300. Specifically, interface 330 includes an antenna for wireless communication with main device 300.

Display unit 340 is a unit for displaying an image. Specifically, display unit 340 includes a display panel composed of display elements such as liquid crystal elements or electroluminescence elements and a driver circuit for the display panel, which panel displays an image according to image data provided by control unit 310.

Touchscreen unit 350 is a unit for detecting operations input by a user. Touchscreen unit 350 is also a unit for generating and providing coordinate information indicative of a position on a display area of display unit 340. Specifically, touchscreen unit 350 includes a sensor configured to correspond to the display area and a control circuit that generates the coordinate information indicative of a position detected by the sensor, and provides the generated coordinate information to control unit 310. A method of detecting a position of touchscreen unit 350 may be resistive or capacitive. In addition, operations of a user may be input by finger touch or by use of a stylus.

Input unit 360 is another unit for detecting operations input by the user. Specifically, input unit 360 includes keys or switches and provides operation information according to an operation input by the user (for example, information indicative of which key is pushed) to control unit 310. A number of keys or switches of input unit 360 is not limited.

The overall hardware configuration of information sharing system 10 has been explained. The configuration explained enables one or more users to play a game or share information in a community that is related to the game by using information sharing system 10. Functions for playing the game are mainly provided by each of gaming systems 20. On the other hand, the information sharing service is provided by cooperation with server device 100 and plural gaming systems 20.

Figure 6:
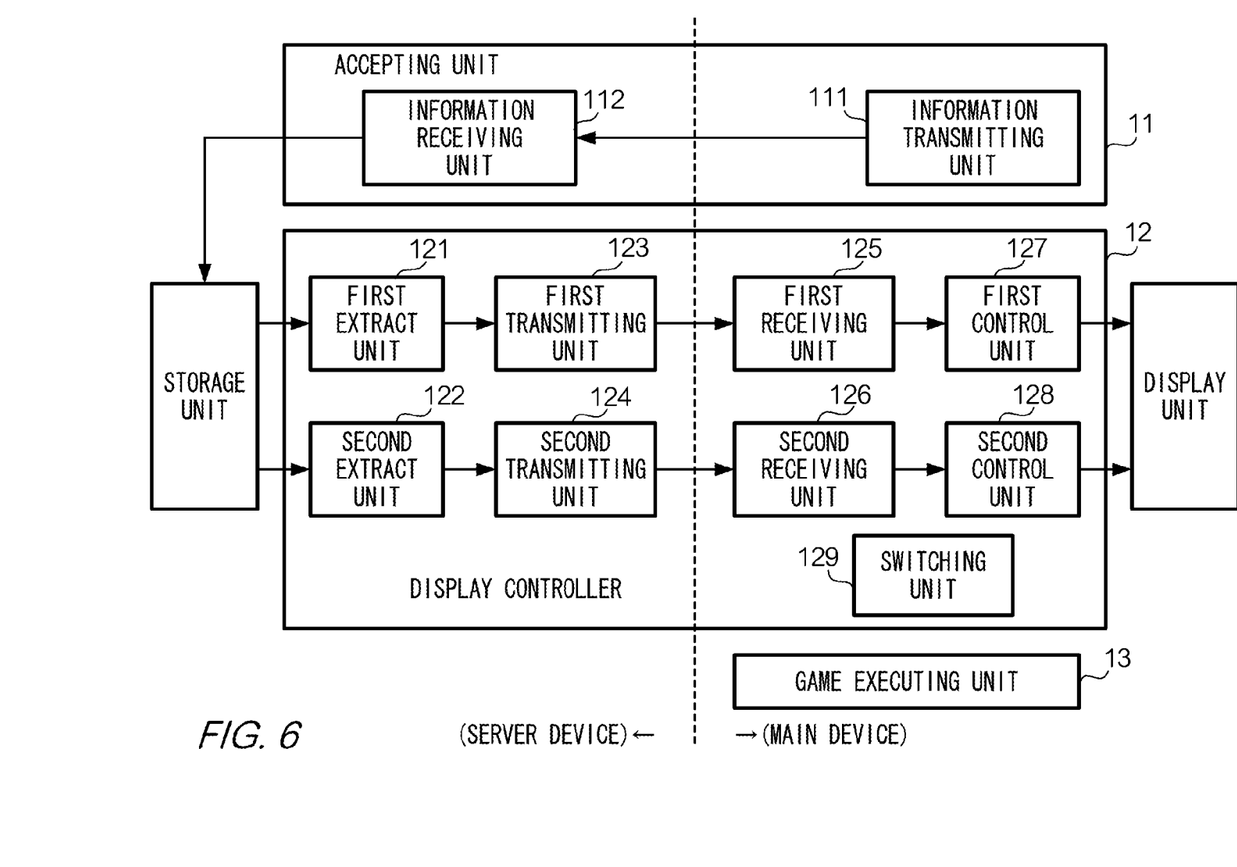
FIG. 6 is a block diagram showing an example of a non-limiting functional configuration of the information sharing system.

FIG. 6 is a block diagram showing a functional configuration of information sharing system 10. Functional components implemented by information sharing system 10 are broadly separated into accepting unit 11, display controller 12, and game executing unit 13. Game executing unit 13 is implemented by main device 200. On the other hand, accepting unit 11 and display controller 12 are implemented by cooperation with server device 100 and main device 200. Each of main devices 200 implements the functions described in FIG. 6 respectively.

Accepting unit 11 is a unit for accepting information from plural users. Information accepted by accepting unit 11 includes at least posting information, response information, and user information. Specifically, accepting unit 11 is separated into information transmitting unit 111 and information receiving unit 112.

Information transmitting unit 111 is implemented by control unit 210 of main device 200. Information transmitting unit 111 generates the above information according to operations of a user (that is, input via controller 300), and transmits the information to server device 100 via network interface 240 and network 500.

Information receiving unit 112 is implemented by control unit 110 of server device 100. Information receiving unit 112 receives the information transmitted from plural main devices 200 via interface 130. Information receiving unit 112 receives information on plural games, since plural games can be played by users.

The information exchanged by information transmitting unit 111 and information receiving unit 112 is as follows. Posting information is information posted (or to be posted) by a user. Each user posts, for example, an impression, feedback, or a walkthrough on a game. In addition, each user can post a screenshot (screen capture) of a game screen or a handwritten text or illustration drawn on touchscreen unit 350. Posting information is transmitted while being associated with a specific community.

Response information is information attached to posting information posted by the user, which represents one or more responses of one or more other users to the posting information. In the present exemplary embodiment, there are two types of user responses; "agreeable" and "comment." Here, "agreeable" is a type of response for expressing a feeling agreeable to a content of the posting information. When a user represents a feeling of "agreeable," the user pushes a "agreeable button" to be described below, which is an easier and a more casual way to express the feeling of the user than providing a "comment." On the other hand, "comment" is a type of response for expressing a feeling of a user by using other posting information. Using "comment" enables the user to express a greater variety of feelings than using "agreeable."

It is to be noted that a response posted by a user to posting information posted by the user (that is, the same user) may be allowed or forbidden by accepting unit 11. Moreover, accepting unit 11 can change whether a response is allowed or forbidden with respect to each type of response. For example, accepting unit 11 may allow a user to comment on posting information posted by the user but not to agree with the posting information. Alternatively, accepting unit 11 may accept any type of responses to posting information from any user, including the user who posted the posting information.

User information is information on a user. User information may include information for identifying the user in information sharing system 10 or information indicative of an attribute of the user. The attribute herein may include gender or age of the user. User information according to the present exemplary embodiment includes play information indicative of a usage status of the user with respect to the game.

Figure 7:
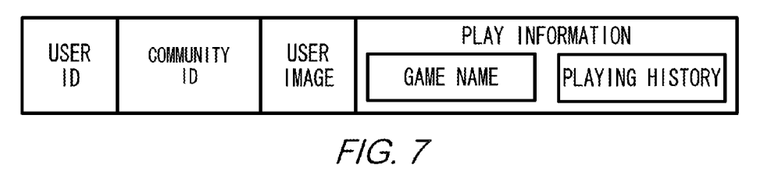
FIG. 7 shows an example of a non-limiting data structure of user information.

FIG. 7 shows an example of a data structure of user information. User information according to the present exemplary embodiment is configured to include "user ID," "community ID," "user image," and "play information." Play information is configured to include "game name" and "playing history."

"User ID" is data for identifying a user. "User ID" may be assigned automatically, or may be a nickname or a screen name decided by the user. "Community ID" is data for identifying a community. "Community ID" included in user information represents a community to which the user belongs. When the user belongs to plural communities, user information of the user includes plural "Community IDs" corresponding to the plural communities. "User image" is image data for identifying a user. "User image" represents, for example, an image of an avatar of the user. "User image" may be configured by the user.

"Game name" is data for identifying a game. "Game name" is typically a name assigned to each game. However, "Game name" is not necessarily a name recognizable to users but an ID automatically assigned in information sharing system 10. "Playing history" includes dates of playing the game (start time and finish time) and a total playing time of the game.

In the present exemplary embodiment, when user information of a user includes play information of a game, it indicates that the user has played the game before. Namely, when a user has played a game before, play information about the game is added to user information of the user. Therefore, it is possible to recognize which game the user has played (or has never played) by referring to user information.

Display controller 12 is a unit for controlling display of posting information. Display controller 12 displays posting information in a list form to a display unit (controller 300 and/or television 400). The "list" herein is a group of plural posting information assembled in accordance with a predetermined rule. In the present exemplary embodiment, the plural items of posting information that are posted to a single community are displayed in a predetermined order such as an order according to posted date. Namely, display controller 12 displays plural items of posting information on a specific game posted to a community by grouping them together.

Specifically, display controller 12 is classified into first extracting unit 121, second extracting unit 122, first transmitting unit 123, second transmitting unit 124, first receiving unit 125, second receiving unit 126, first control unit 127, second control unit 128, and switching unit 129. In the present exemplary embodiment, first extracting unit 121, second extracting unit 122, first transmitting unit 123, and second transmitting unit 124 are implemented by control unit 110 of server device 100. On the other hand, first receiving unit 125, second receiving unit 126, first control unit 127, second control unit 128, and switching unit 129 are implemented by control unit 210 of main device 200.

First extracting unit 121 is a unit for extracting all or part of plural items of posting information on a specific game posted to a community from a storage unit (for example, storage unit 120). First extracting unit 121 can extract part of the plural items of posting information independently of a usage status of the game. For example, first extracting unit 121 may extract a predetermined number (for example, 100) of items of posting information in an order according to posted date.

On the other hand, second extracting unit 122 is a unit for selectively extracting posting information, which is subject to be extracted by first extracting unit 121, and which is posted by a user (hereinafter referred as a "poster") who satisfies a predetermined condition. For example, second extracting unit 122 extracts posting information based on a poster's playing history of the game.

First transmitting unit 123 and second transmitting unit 124 are units for transmitting posting information per list. First transmitting unit 123 transmits posting information extracted by first extracting unit 121, and second transmitting unit 124 transmits posting information extracted by second extracting unit 122. The posting information to be transmitted by second transmitting unit 124 differs from the posting information to be transmitted by first transmitting unit 123 in that the posting information is narrowed down based on user information.

First receiving unit 125 and second receiving unit 126 are units for receiving posting information per list. First receiving unit 125 receives posting information transmitted by first transmitting unit 123, and second receiving unit 126 receives posting information transmitted by second transmitting unit 124.

First control unit 127 and second control unit 128 are units for controlling display of posting information by the display unit. First control unit 127 displays posting information received by first receiving unit 125, and second control unit 128 displays posting information received by second receiving unit 126.

It is to be noted that first control unit 127 and second control unit 128 may display posting information to the same display unit or to different display units. For example, first control unit 127 may display posting information to one of controller 300 and television 400 while second control unit 128 displays posting information to the other.

Switching unit 129 is a unit for switching a display mode of the display device. Switching unit 129 switches a display mode of posting information from one of a first mode and a second mode to the other. The first mode herein is a display mode displaying posting information extracted by first extracting unit 111, and the second mode is a display mode displaying posting information extracted by second extracting unit 112. Namely, the second mode is a display mode displaying posting information of a narrower scope than that of the first mode. Switching unit 129 switches the display mode according to an instruction of the user.

Game executing unit 13 is a unit for executing a game that is available to a user. An "available" game is, for example, a game read by disk drive unit 230 from an optical disk or a game stored in storage unit 120 (such as a downloaded game or a pre-installed game).

In information sharing system 10, a game is played and posting information is posted and browsed by each user. Main processes executed in information sharing system 10 are a game executing process, a recording process, and a displaying process. The game executing process is executed by each of gaming systems 20. The recording process is a process for recording posting information transmitted from each of gaming systems 20. The displaying process is a process for displaying posting information of a community.

Figure 8:
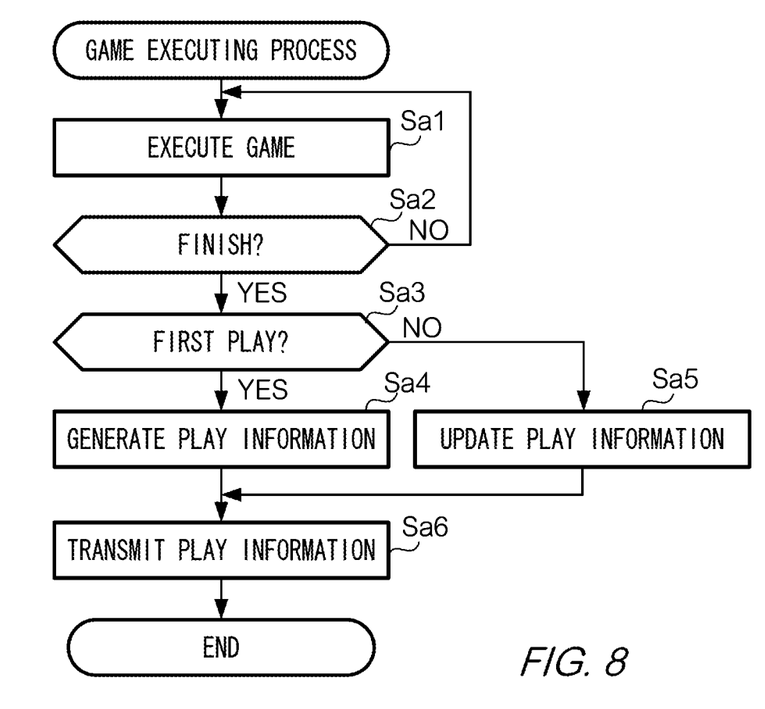
FIG. 8 is a flowchart showing an example of a non-limiting game executing process.

FIG. 8 is a flowchart showing the game executing process, which is executed by control unit 210 of main device 200. Control unit 210 executes this process each time a game is executed.

First, control unit 210 executes a game according to an instruction of a user (step Sa1). When execution of the game has finished, control unit 210 executes generating or updating of play information. Specifically, control unit 210 determines whether the execution of the game is finished (step Sa2). If the execution of the game is finished, control unit 210 determines whether this play of the game is an initial play (hereinafter referred as a "first play") by the user by determining whether play information about the game already exists (step Sa3).

If the present play is a first play for the user, control unit 210 generates new play information (step Sa4). Control unit 210 measures playing time of the game and records it as "playing history" with a "game name" of the game. The game name is included in data constituting the game. Control unit 210 can recognize the game name when executing the game. On the other hand, if the present play is not a first play for the user, control unit 210 updates existing play information (step Sa5). At that time, control unit 210 identifies play information of the game based on its game name, and updates "playing history" of the identified play information.

Control unit 210 transmits play information to server device 100 at an appropriate time (step Sa6). Control unit 210 may transmit play information of a game each time the user plays the game. Alternatively, control unit 210 may transmit play information of one or more games as a block of information at a predetermined time (for example, every hour on the hour, once a day, and at the time of startup of main device 200). At that time, control unit 210 transmits the play information together with "user ID." In addition, control unit 210 may transmit user information other than "user ID" and "play information," in a case where the user changes his/her "user image" or participates in a new community and so on. Server device 100 records "play information" transmitted from each of gaming systems 20 in storage unit 120.

Figure 9:
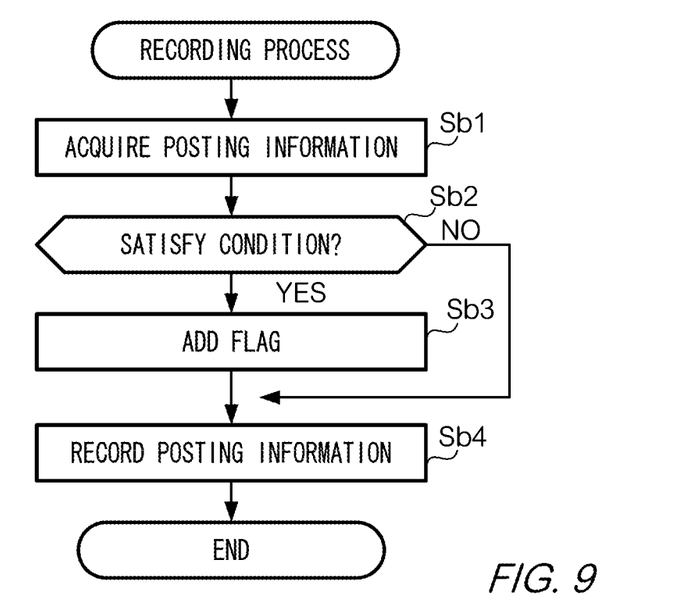
FIG. 9 is a flowchart showing an example of a non-limiting recording process.

FIG. 9 is a flowchart showing the recording process executed by control unit 110 of server device 100. Control unit 110 executes this process every time it receives posting information.

When posting information on a community is transmitted, control unit 110 acquires the posting information via interface 130 (step Sb1). Control unit 110 identifies a game corresponding to the community and a user who posted the posting information (that is, a poster), and determines whether a usage status of the user on the game satisfies a predetermined condition (step Sb2). In the present exemplary embodiment, control unit 110 can determine whether the usage status satisfies the condition by determining whether storage unit 120 stores play information of the game (that is, whether the user has played the game). It is to be noted that each community is associated in advance with one of plural games. Therefore, if "community ID" is identified, control unit 110 can identify which game the community relates to.

If the usage status satisfies the predetermined condition, control unit 110 adds a flag to posting information (step Sb3). Control unit 110 records the posting information to which the flag is added in storage unit 120 (step Sb4). On the other hand, if the usage status does not satisfy the condition, control unit 110 records the posting information without adding the flag (step Sb4). The flag herein is, if the user has played the game for any length of time, added to posting information. It can also be said that the flag is information indicative of whether the user possesses the game.

Figure 10:
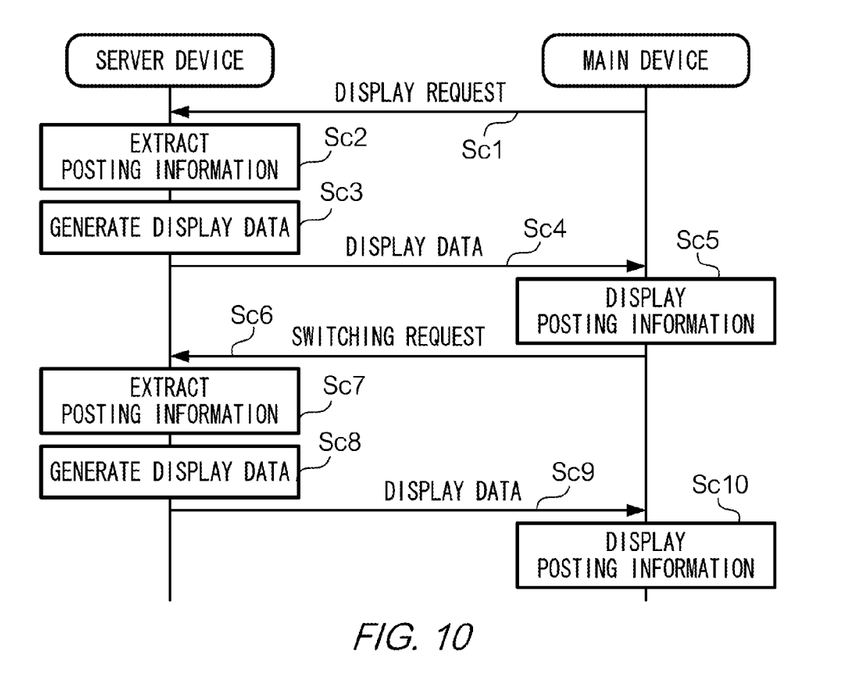
FIG. 10 is a sequence chart showing an example of a non-limiting displaying process.

FIG. 10 is a sequence chart showing the displaying process. The displaying process is executed by server device 100 and gaming system 20 of a user who belongs to a community and makes a request to browse posting information of the community. It is to be noted that steps shown in FIG. 10 are part of the displaying process. The displaying process may include one or more steps not shown in FIG. 10.

During browsing of posting information, main device of gaming system 20 transmits a display request according to an instruction of a user (step Sc1). In the present embodiment, the display request is a request for displaying posting information by the first mode, which is a display mode independent of the usage status of the game. The display request includes at least "community ID" of a community whose information is to be displayed.

When received the display request, server device 100 extracts posting information satisfying the condition (step Sc2). Specifically, server device 100 extracts posting information associated with the community according to the display request. Server device 100 generates display data for displaying posting information in the list form (step Sc3) and transmits it (step Sc4). The display data herein may be data such as described in a HTML (HyperText Markup Language) or a script language.

When it has received display data, main device 200 displays an image according to the display data on at least one of controller 300 and television 400 (step Sc5). Hereinafter, both controller 300 and television 400 display posting information. For example, main device 200 converts display data into image data suitable for displaying in controller 300 and television 400, and provides the image data for controller 300 and television 400.

Although not shown in FIG. 10, the user can perform operations to posting information such as "agreeable" and "comment." while browsing posting information. In a case where such response information is attached to posting information, main device 200 exchanges data with server device 100.

When switching the display mode of posting information, the user performs an operation requesting that the switch be performed. Hereinafter, such an operation will be referred to as a "switching request." In the present exemplary embodiment, the switching request is a request for switching the display mode from the first mode (the display mode not narrowed down by the usage status) to the second mode (the display mode narrowed down by the usage status).

When the switching request is transmitted from main device 200 (step Sc6), server device 100 extracts posting information that satisfies the condition (step Sc7). In step Sc7, server device 100 narrows down posting information extracted in step Sc2. Specifically, server device 100 extracts posting information to which the flag is added from posting information extracted in step Sc2. This step enables posting information to which the flag is not added, that is, posting information posted by a user who has not played the game yet, to be excluded from objects to be displayed.

When posting information has been extracted in step Sc7, server device generates display data and transmits it to main device 200 (steps Sc8, Sc9). These steps are the same steps as steps Sc3 and Sc4 with the exception that the extracted posting information is different. When it has received display data, main device 200 displays an image according to the display data to controller 300 and television 400 (step Sc10). Step Sc10 is also the same step as step Sc5.

Figure 11:
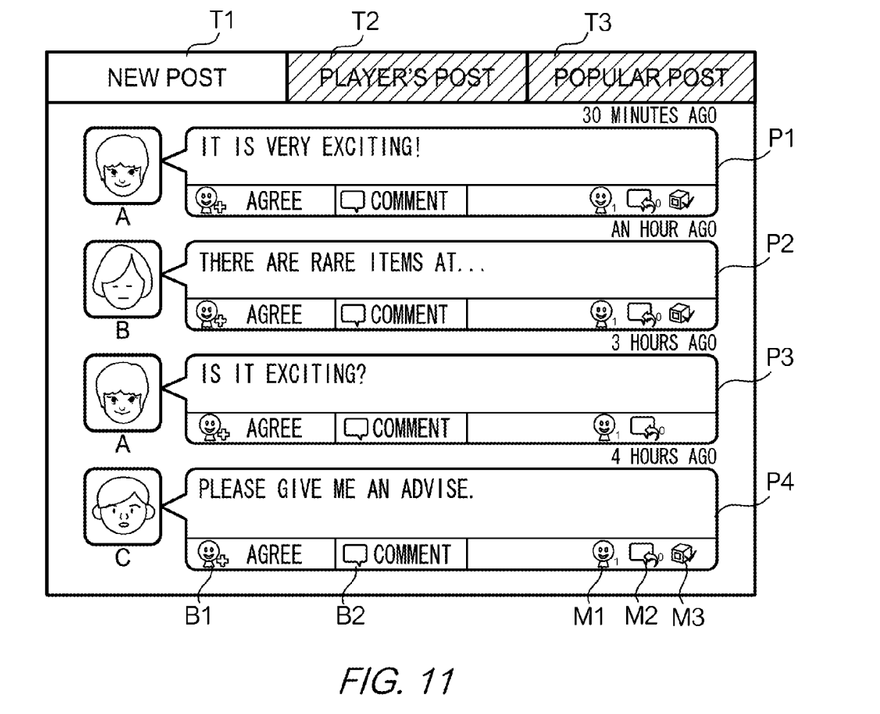
FIG. 11 shows a display example of a non-limiting posting information.
Figure 12:
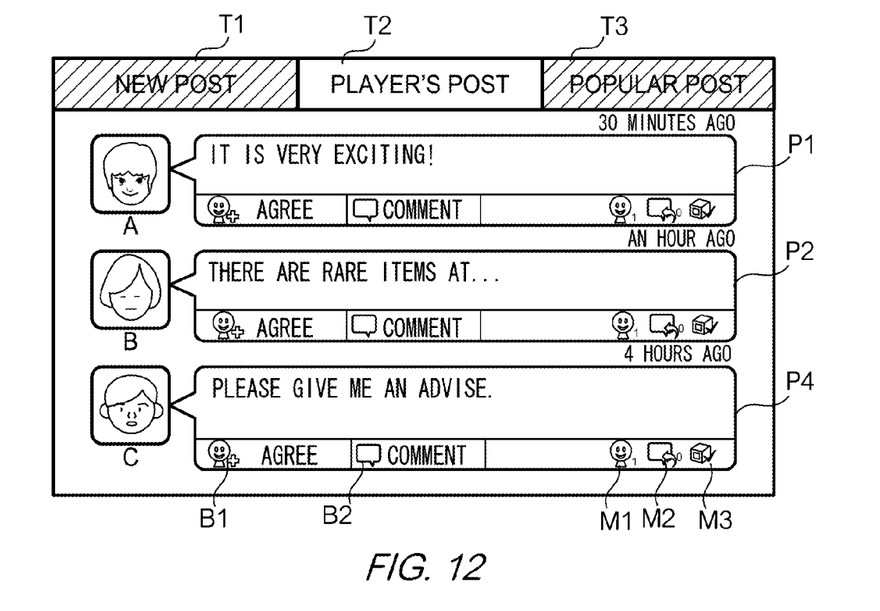
FIG. 12 shows another display example of the posting information.

FIGS. 11 and 12 show display examples of screens displaying posting information. FIG. 11 shows a display example of a screen in the first mode. Contrastingly, FIG. 12 shows a display example of a screen in the second mode.

In these screens, tabs T1, T2, and T3 are objects for switching the display mode. When the user selects tab T1, main device 200 displays posting information in the first mode, and when the user selects tab T2, main device 200 displays posting information in the second mode. Also, when the user selects tab T3, main device 200 displays posting information in a third mode. The third mode herein is a display mode for displaying posting information narrowed down by the number of "agreeable" responses from users. However, the third mode is not necessarily included in display modes of the present technique. Additionally, an initial state of the screen is the first mode in the present exemplary embodiment, which is not necessarily required.

The example of FIG. 11 shows a case in which 4 posts are displayed, P1, P2, P3, and P4 posted by users A, B, and C. User A posts posting information after and before playing a game respectively (P1 and P3). Namely, User A posts posting information twice. In the example, posting information is displayed inside a balloon. In addition, "user ID," "user image," and a posting time are displayed near the balloon. Moreover, there are some buttons and icons displayed inside the balloon.

Button B1 is an "agreeable" button. A user can express an agreeable feeling by selecting the button. Button B2 is a "comment" button. The user can leave a comment by selecting the button. When either one of these buttons is selected, main device 200 transmits response information to server device 100.

Mark M1 indicates the number of responses of "agreeable" to the post. Mark M2 indicates the number of responses of "comment" to the post. Each number is displayed beside each mark.

Mark M3 indicates an addition of the flag to the posting information. Namely, mark M3 indicates that a poster of the posting information has played the game before the time of posting. In FIG. 11, mark M3 is displayed with posts P1, P2, and P4, and is not displayed with post P3. This means that user A posted post P3 before playing the game and post P1 after playing the game.

In contrast, in the example of FIG. 12, that is, the second mode, post P3 is excluded from objects to be displayed.

Therefore, only posts P1, P2, and P4 are displayed in the screen. The screen shown in FIG. 12 is the same as that shown in FIG. 11 with the exception that tab T2 is selected and post P3 is not displayed. In this example, when the screen is displayed, user A has already played the game before. However, post P3 is excluded from objects to be displayed. It is determined by whether the user has played the game before the time of posting posting information (the posting time) whether to display the posting information.

As described in the foregoing, according to the present exemplary embodiment, users can browse posting information in the first and second mode selectively. Therefore, users can use different display modes as needed. Users can browse various items of posting information in the first mode, or only items of posting information posted by posters who have played the game before. In the second mode, it is possible to display more credible posting information by limiting displayed information to posting information posted by users who have played the game before. For example, if users who have never played the game repeat posts that are not relevant to the game or are false rumors, the second mode enables filtering of such posting information.

However, posting information posted by users who have not played the game is not always without value. According to the present exemplary embodiment, it is possible to browse such posting information as needed.

2. Modifications

The above exemplary embodiment is an example of an embodiment of the present technique. The present technique may be implemented in embodiments shown by the following modifications, other than the above exemplary embodiment. The following modifications may be combined with each other as appropriate.

(Modification 1)

It can also be said that the above "comment" is a form of posting information. Namely, the comment may be an item of posting information (second posting information), which is subordinate to another item of posting information (first posting information). Therefore, server device 100 and main device 200 may handle comments in the same way as posting information. For example, comments may be attached response information such as the above-described "agreeable" or "comment." In addition, plural comments may be added to an item of posting information.

When displaying posting information in the second mode, display controller 12 may control display of posting information according to not only the usage status of the user who posted posting information (first posting information) but also the usage status of the user who posted a comment (second posting information). For example, in a case where at least one of posters of posting information and a comment has not played the game, display controller 12 may exclude both posting information and a comment from objects to be displayed. Alternatively, in a case where plural comments are subordinated to an item of posting information and some posters of the plural comments have not played the game, display controller 12 may display comments other than those posted by the posters who have not played the game.

(Modification 2)

Response information is optional data in the present technique. In addition, it may be possible for each user to select whether response information can be attached to posting information. In this case, users may select a type of response information that may be attached with respect to each type of response. For example, a user can allow "agreeable" information but not a "comment" to be attached.

To implement such control, accepting unit 11 may accept configuration information for configuration of attaching response information.

Figure 13:
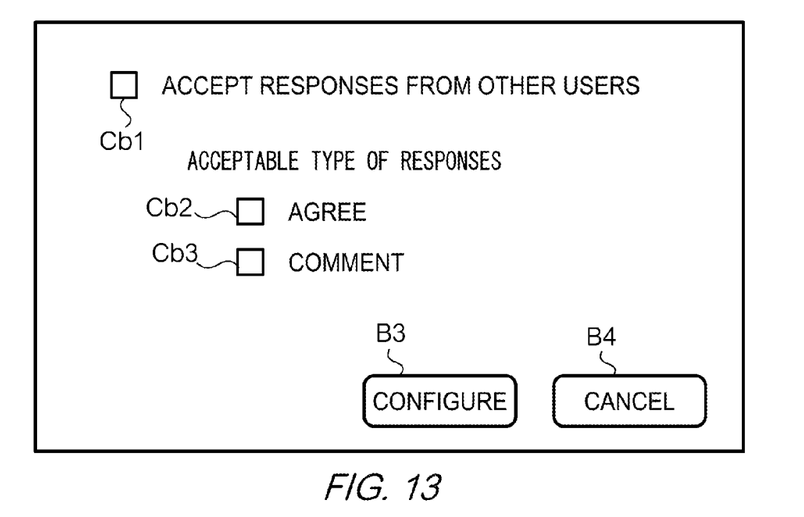
FIG. 13 shows an example of a non-limiting configuration screen.

FIG. 13 shows an example of a configuration screen for accepting configuration information. Plural checkboxes Cb1, Cb2, and Cb3, configuration button B3, and cancel button B4 are displayed on the configuration screen. For example, if a user allows all types of responses from other users, the user selects checkboxes Cb1, Cb2, and Cb3, or if the user forbids all types of responses from other users, the user does not select any checkbox. When the user selects configuration button B3 after selecting checkboxes Cb1, Cb2, or Cb3, accepting unit 11 accepts configuration information representative of a result of selection of the checkboxes, and allows or forbids attaching of response information according to the accepted configuration information. It is to be noted that such configuration information may be configured with each of posting information or with all of posting information in a block. Display controller 12 does not necessarily display posting information to which it is forbidden to attach response information according to configuration information as being distinct from posting information to which it is allowed to attach response information according to configuration information.

If it is forbidden to attach response information to posting information according to configuration information, accepting unit 11 performs control so as not to accept response information. To implement this control, server device 100 may generate display data whereby buttons B1 and B2 (shown in FIG. 11) are not shown in a screen. Alternatively, main device 200 may ignore selecting of these buttons.

It is possible to determine whether to attach response information to posting information according to a usage status of a user who attaches the response information. For example, a user may limit users who can attach response information to users who have played the game before. In this case, accepting unit 11 may determine whether to accept response information with respect to each type of response. Such limitation may be set automatically, instead of by configurations input by each user.

(Modification 3)

In the above exemplary embodiment, main device 200 generates or updates play information after execution of a game, as shown in FIG. 8. However, main device 200 may generate or update play information in parallel with the execution of the game. This enables main device 200 to determine the usage status of the game more accurately even when the user posts posting information while playing the game.

(Modification 4)

The screen display in the above second mode can be implemented by main device 200. To implement such a display, main device 200 receives each item of posting information (instead of the display data) and determines whether to display the received posting information in the second mode by referring to the flag added to the posting information. In this case, main device 200 is configured to generate display data based on the received posting information.

(Modification 5)

According to the present technique, there may be one or more display devices for each user. In addition, switching of the mode of display of posting information is not always essential. For example, if controller 300 (or television 400) displays posting information in the first mode and television 400 (or controller 300) displays posting information in the second mode, the switching of the display mode is not necessary. Similarly, displaying posting information in first and second mode in a single screen can eliminate the need for the switching of the display mode. In these cases, switching unit 129 is not necessary.

(Modification 6)

According to the present technique, a usage status of a game may represent a degree of use, not an existence of use (that is, whether the game has been played). For example, the degree of use herein represents a total time or a total number of times of playing the game. Alternatively, the degree of use may represent a level of skill or proficiency in playing the game. For example, the usage status may be determined by points, levels, or ranking in the game. Such usage status enables users to browse posts posted by good players in the second mode selectively.

A usage status of a game may be not only indicated as an alternative, but also may be graded. For example, when users are classified into 3 levels such as "beginners," "intermediate users," and "experts" according to the usage status of the game, users can browse posting information with respect to each level of posters.

(Modification 7)

According to the present technique, the function of executing a game and the function of sharing information are implemented in different devices. Therefore, game executing unit 13 is an optional component in information sharing system 10. In such a case, the function of sharing information is not necessarily implemented by a gaming device; for example, it may be implemented by a personal computer. In addition, a function of game executing unit 13 can be implemented by cooperation of main device 200 and server device 100.

(Modification 8)

According to the present technique, the types of response information are not limited to "agreeable" and "comment." Response information may represent a feeling of a user such as "like" or "dislike," or an evaluation of posting information such as points or hierarchical ranking.

(Modification 9)

The present technique can be applied to a content (a digital content) other than a game. The content herein may be data for playing music or a movie, or software of an application such as a word processing or a spreadsheet program. Moreover, the present technique can be applied to a web site for sharing reviews of a product to display reviews posted by users who have used the product selectively.

(Modification 10)

The configuration of the present technique is not limited to that described in the above exemplary embodiment. For example, main device 200 and controller 300 are integrated with a single apparatus, or main device 200 and server device 100 are integrated with a single apparatus. One or more components of one of main device 200 and server device 100 can be configured with the other.

The present technique can provide not only an information sharing system 10, but also server device 100, display system including main device 200 and one or more display devices (controller 300 and/or television 400), an information sharing method, and others. Moreover, the present technique can provide a program to realize the function of server device 100 or main device 200. The program may be provided in the form of a storage medium such as an optical disk or a semiconductor memory. Alternatively, the program may be downloaded via a network such as the Internet.

What is claimed is:

1. An information sharing system, comprising:
   storage memory; and
   at least one computer processor configured to:
   receive game play information from a plurality of game devices respectively operated by a plurality of users;
   receive first posting information on a game posted by each of the plurality of users, and store the first posting information in the storage medium;
   generate a display of the first posting information on a first screen; and
   determine whether a condition is satisfied based on the received game play information;
   generate a display, on a second screen, of second posting information based on a determination that the condition has been satisfied, in which the second posting information is to be displayed on the first screen and which is posted by one of the plurality of users whose status satisfies the condition on play of the game; wherein:
   the second posting information does not include all posting information of the first posting information; and
   the condition represents whether the game has been played before the second posting information is posted so that the second posting information displayed on the second screen represents posting information posted by the one of the plurality of users who has played the game before posting the second information.

2. The information sharing system according to claim 1, wherein:
   the second posting information is subordinate to the first posting information; and
   the at least one computer processor does not display both the first posting information and the second posting information in a case where a status of at least one of the plurality of users who posted the first posting information or the second posting information does not satisfy the condition.

3. The information sharing system according to claim 1, wherein the at least one computer processor does not display, when an item of the posting information is posted by a user whose status does not satisfy the condition, the item of the posting information, regardless of whether the user's status later satisfies the condition.

4. The information sharing system according to claim 1, wherein:
   the at least one computer processor accepts the posting information together with response information representative of one or more responses to the posting information, and configuration information representative of whether attaching the response information to the posting information is allowed; and
   the at least one computer processor does not accept the response information, when the posting information is not allowed to be attached to the response information in accordance with the configuration information.

5. The information sharing system according to claim 4, wherein:
   the response information represents a plurality of types of responses;
   the configuration information represents an allowance to attach the response information to the posting information with respect to each type of response; and
   the at least one computer processor determines whether to accept the response information in accordance with the configuration information.

6. The information sharing system according to claim 1, wherein the at least one computer processor is further configured to switch between the first screen and the second screen, in accordance with an instruction of a user.

7. The information sharing system according to claim 1, wherein the condition represents a degree of use of the game.

8. The information sharing system according to claim 1, wherein the first and second screens are displayed on the same display.

9. A server device, comprising storage memory and at least one computer processor configured at least to:
   receive game play information from a plurality of game devices respectively operated by a plurality of users;
   extract first posting information on a game posted by each of the plurality of users from a storage unit;
   determine whether a condition is satisfied based on the received game play information;
   extract the second posting information from the first posting information based on a determination that the condition has been satisfied, in which the second posting information is subject to be extracted and which is posted by one of the plurality of users whose status satisfies the condition on play of the game; and
   output the extracted first and second posting information respectively; wherein:
   the second posting information does not include all posting information of the first posting information; and
   the condition represents whether the game has been played before the second posting information is posted so that the second posting information that is output represents posting information posted by the one of the plurality of users who has played the game before posting the second information.

10. A display system, comprising:
    a receiver configured to receive game play information from a plurality of game devices respectively operated by a plurality of users;
    a processor configured to determine whether a condition is satisfied based on the received game play information;
    at least one display configured to display a first screen showing first posting information on a game posted by each of the plurality of users, and configured to display a second screen showing the second posting information based on a determination that the condition has been satisfied, in which the second posting information is to be displayed to the first screen and which is posted by one of the plurality of users whose status satisfies the condition on play of the game; wherein:
    the second posting information does not include all posting information of the first posting information; and
    the condition represents whether the game has been played before the second posting information is posted so that the second posting information displayed on the second screen represents posting information posted by the one of the plurality of users who has played the game before posting the second information.

11. A non-transitory storage medium storing a program for causing a computer to execute:
    receiving game play information from a plurality of game devices respectively operated by a plurality of users;
    determining whether a condition is satisfied based on the received game play information;
    extracting a plurality of first items of posting information on a game posted by each of the plurality of users;

extracting a plurality of second posting information from the plurality of first items of posting information based on a determination that the condition has been satisfied, in which the second items of posting information are subject to be extracted and which are posted by at least one of the plurality of users whose status satisfies the condition on play of the game; and outputting the extracted first and second posting information respectively, wherein:

the second items of posting information do not include all posting information of the first items of posting information; and the condition represents whether the game has been played before th second items of posting information is posted so that the second items of posting information that are output represent posting information posted by the at least one of the plurality of users who has played the game before posting the second items of the posted information.

12. A non-transitory storage medium storing a program for causing a computer to execute:

receiving game play information from a plurality of game devices respectively operated by a plurality of users;

determining whether a condition is satisfied based on the received game play information;

displaying a plurality of first items of posting information on a game posted by each of a plurality of users on a first screen; and displaying, on a second screen, a plurality of second items of the posting information based on a determination that the condition has been satisfied, in which the second items of posting information are to be displayed on the first screen and which are posted by at least one of the plurality of users whose status satisfies the condition on play of the game; wherein:

the second items of posting information do not include all posting information of the first items of posting information; and the condition represents whether the game has been played before the second items of posting information is posted so that the second items of posting information that are displayed on the second screen represent posting information posted by the at least one of the plurality of users who has played the game before posting the second items of the posted information.

13. An information sharing method, comprising:

receiving game play information from a plurality of game devices respectively operated by a plurality of users;

determining whether a condition is satisfied based on the received game play information;

receiving first posting information on a game posted by each of the plurality of users;

displaying the received first posting information; and displaying second posting information based on a determination that the condition has been satisfied, in which the second posting information is to be displayed and which is posted by at least one of the plurality of users whose status satisfies the condition on play of the game;

the second posting information does not include all posting information of the first posting information; and the condition represents whether the game has been played before the second posting information is posted so that the second posting information that is displayed represents posting information posted by the at least one of the plurality of users who has played the game before posting the second information.

* * * * *